US012683475B2

(12) United States Patent
Kammerer et al.

(10) Patent No.: US 12,683,475 B2
(45) Date of Patent: Jul. 14, 2026

(54) LINEAR MOTORS WITH YOKES HAVING INCLINED MARGINAL TEETH

(71) Applicant: Schneider Electric Industries SAS, Rueil Malmaison (FR)

(72) Inventors: Thomas Kammerer, Friesenheim (DE); Frank Brechtefeld, Offenburg (DE); Stefan Ohnemus, Schuttertal (DE)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 206 days.

(21) Appl. No.: 18/512,720

(22) Filed: Nov. 17, 2023

(65) Prior Publication Data

US 2024/0171054 A1    May 23, 2024

(30) Foreign Application Priority Data

Nov. 18, 2022    (EP) ..................................... 22208279

(51) Int. Cl.
*H02K 41/025*    (2006.01)
*H02K 1/16*    (2006.01)
*H02K 41/02*    (2006.01)

(52) U.S. Cl.
CPC .............. *H02K 41/02* (2013.01); *H02K 1/16* (2013.01)

(58) Field of Classification Search
CPC ...... H02K 41/02; H02K 41/025; H02K 41/03; H02K 41/031; H02K 41/033; H02K 1/16; H02K 1/165; H02K 33/16; H02K 35/02
USPC ......... 310/12.11, 216.079, 216.086, 216.098
See application file for complete search history.

(56) References Cited

U.S. PATENT DOCUMENTS

| | | | | |
|---|---|---|---|---|
| 2006/0125326 | A1* | 6/2006 | Baccini ................ | H02K 41/031 310/12.25 |
| 2008/0129125 | A1* | 6/2008 | Pagani ................. | H02K 41/033 310/12.25 |
| 2010/0013327 | A1* | 1/2010 | Hoppe ................. | H02K 41/033 310/46 |
| 2010/0327670 | A1* | 12/2010 | Chung ................... | H02K 16/04 310/12.22 |
| 2013/0033125 | A1* | 2/2013 | Nagamatsu .......... | H02K 41/031 310/12.19 |

(Continued)

FOREIGN PATENT DOCUMENTS

| | | |
|---|---|---|
| CN | 110165852 A | 8/2019 |
| CN | 212012439 U | 11/2020 |

(Continued)

OTHER PUBLICATIONS

Machine translation of EP-3429072-A1. (Year: 2019).*

(Continued)

*Primary Examiner* — Michael Andrews
(74) *Attorney, Agent, or Firm* — Quinn IP Law

(57) ABSTRACT

A linear motor for a transport system, in particular for a multi-carrier system, has a yoke comprising a plurality of teeth arranged after one another and a plurality of drive coils arranged at the teeth. The drive coils are configured to cooperate with drive magnets of a transport element to bring about a drive force for moving the transport element along a guide track of the transport system. The teeth have marginal teeth arranged at the two ends of the yoke. At least one of the marginal teeth is inclined with respect to the other teeth.

20 Claims, 4 Drawing Sheets

(56) References Cited

U.S. PATENT DOCUMENTS

Figure 1:
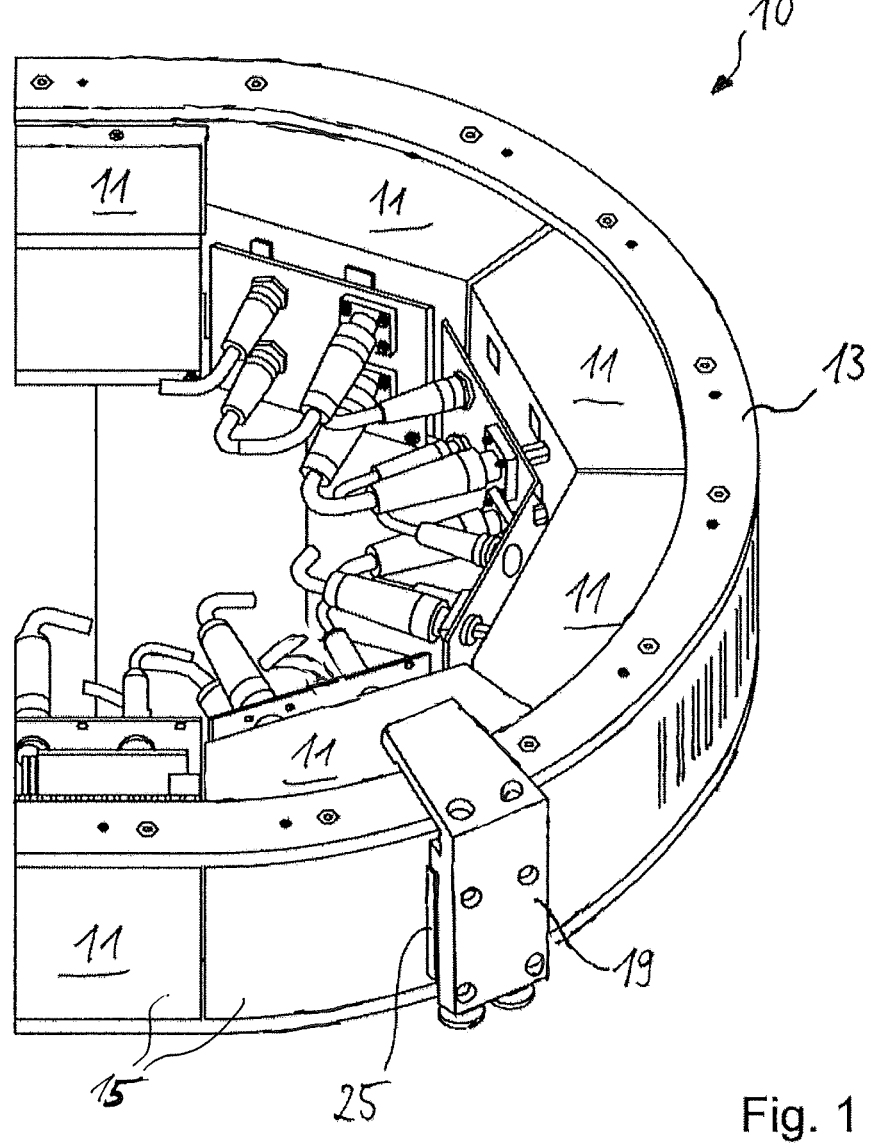

| | | | | |
|---|---|---|---|---|
| 2015/0288230 A1* | 10/2015 | Foulsham | ................ | H02K 1/08 |
| | | | | 310/43 |
| 2016/0164395 A1* | 6/2016 | Sommerhalter, Jr. | ... | B60L 13/03 |
| | | | | 310/12.11 |
| 2017/0210575 A1 | 7/2017 | Tamellini | | |
| 2019/0002204 A1* | 1/2019 | Reinthaler | .............. | H02K 1/14 |
| 2023/0318426 A1* | 10/2023 | Yokochi | .............. | H02K 41/033 |
| | | | | 310/12.18 |

FOREIGN PATENT DOCUMENTS

| | | | | | |
|---|---|---|---|---|---|
| DE | 102006035674 A1 | 2/2008 | | | |
| EP | 0915553 B1 | 2/2006 | | | |
| EP | 2779390 A2 | 9/2014 | | | |
| EP | 3031755 A1 | 6/2016 | | | |
| EP | 3197031 A1 | 7/2017 | | | |
| EP | 3425780 A1 | 1/2019 | | | |
| EP | 3429072 A1 * | 1/2019 | ........... | H02K 11/225 |

OTHER PUBLICATIONS

Extended European Search Report dated May 16, 2023 for corresponding European Patent Application No. 1 22208279.4-1202, 8 pages.

* cited by examiner

LINEAR MOTORS WITH YOKES HAVING INCLINED MARGINAL TEETH

The invention relates to a linear motor for a transport system, in particular for a multi-carrier system, and to a transport system that has a plurality of linear motors.

Transport systems, i.e. in particular multi-carrier systems, preferably comprise a large number of transport elements, so-called carriers, that are moved by means of a plurality of linear motors arranged in a row along a guide track. The transport elements are in this respect movable individually and independently of one another along the guide track such that multi-carrier systems provide the possibility of being flexibly adapted to different industrial processes and in particular also of being able to react flexibly to changes in an industrial process.

The drive force for the transport elements is generated electromagnetically by providing each of the linear motors with a yoke that has a plurality of teeth. Drive coils are arranged at the teeth and cooperate with drive magnets of the transport elements. The teeth are each spaced apart from one another by a tooth pitch, but tooth pitch errors occur at the transitions between two adjacent linear motors and lead to magnetic discontinuities and a resulting reduced drive force for the transport elements at the transitions. Causes for this tooth pitch error may be, for example, tolerances, necessary space for a housing wall, an assembly gap, or an assembly space available at the linear motor for a necessary cover.

It is an object of the present invention to homogenize the magnetic field of a transport system.

This object is satisfied by the subjects of the independent claims. Advantageous further developments are the subject of the dependent claims and can be seen from the description and the drawings.

The linear motor according to the invention for a transport system, in particular for a multi-carrier system, has a yoke comprising a plurality of teeth arranged after one another and a plurality of drive coils arranged at the teeth. The drive coils are configured to cooperate with drive magnets of a transport element to bring about a drive force for moving the transport element along a guide track of the transport system. The teeth have marginal teeth arranged at the two ends of the yoke, wherein at least one of the marginal teeth is inclined with respect to the other teeth.

Both marginal teeth can preferably be inclined with respect to the other teeth.

The yoke, which in particular consists of a ferromagnetic material, preferably extends along a direction that approximately corresponds to the direction of extent of the guide track. Teeth project in parallel with one another, in particular at right angles to the direction of extent of the yoke, with preferably equal spacings from one another that extend from a tooth base at the connection point with the yoke to a free end of the tooth. The teeth are usually part of the yoke and formed in one part therewith, but it is generally also conceivable that the teeth and the yoke are formed in two parts and are connected to one another. The teeth of each linear motor are thus arranged in a row along the direction of extent of the yoke, wherein the first tooth and the last tooth in this row, i.e. the teeth that respectively adjoin a linear motor arranged upstream or downstream, are referred to as marginal teeth.

The drive coils usually have a coil body and a wire wound thereon, wherein the drive coils are preferably arranged at the teeth such that each tooth receives a central opening of the respective coil body so that the respective drive coil surrounds the respective tooth. In this respect, the free end of a tooth usually projects slightly beyond the drive coil or ends approximately flush with the drive coil.

The teeth each have a head at their free end and the heads of adjacent teeth are spaced apart from one another by a tooth pitch. The tooth pitch is a very relevant measure for the shape of the magnetic field and defines the spacing between the center axes of two adjacent teeth at their free ends and, accordingly, the spacing of the center axes of two adjacent drive coils. Ideally, within a linear motor or within all the linear motors of a transport system, the tooth pitches of the teeth are identical.

The teeth each have a tooth base, with the tooth bases of adjacent teeth being spaced apart from one another by a tooth base spacing. The tooth base spacing of the teeth is preferably identical to one another, however, according to the invention, the tooth base spacing of the marginal teeth from their adjacent teeth can deviate from the tooth base spacings between the other teeth, in particular can be smaller. The tooth base spacing in particular refers to the spacing between the flanks of two adjacent teeth at the tooth base.

At the transition points of two mutually adjoining linear motors, there is usually a tooth pitch error between the last marginal tooth of the preceding linear motor and the first marginal tooth of the following linear motor, i.e. the tooth pitch between the two marginal teeth does not correspond to the tooth pitch of the other teeth within a linear motor, which can lead to an inhomogeneity of the magnetic field, a reduced drive force for the transport elements, and a more difficult controllability.

Since the marginal teeth are inclined, the drive coil surrounding the marginal tooth is also arranged inclined, but this is not detrimental to a homogeneous magnetic field in practice. The angle of inclination of the marginal teeth is preferably rather small and can, for example, amount to a maximum of 3°, preferably a maximum of 1°.

The marginal tooth or both marginal teeth can in particular be inclined in the direction of extent of the yoke, and indeed in particular such that the head of the marginal tooth is inclined towards the end of the yoke in the direction of extent of the yoke. In other words, the head of the marginal tooth is closer to the end of the yoke in the direction of extent than the tooth base of the marginal tooth.

This in particular takes place such that the tooth pitch between the marginal tooth and the adjacent tooth of the same linear motor corresponds to the tooth pitch between the other teeth. The invention thus provides that the tooth base of the marginal tooth moves closer to the tooth base of the adjacent tooth than would be the case with a non-inclined marginal tooth. With this measure, the spacing between adjacent marginal teeth of adjacent linear motors can be optimized since the marginal region of the linear motor can be made more compact and the marginal tooth in particular leaves more space for a compact installation of a cover of the linear motor. Thus, the tooth pitch between these adjacent marginal teeth can be set such that the tooth pitch error is as close as possible to its desired value. This enables a homogenization of the magnetic field, in particular at the transitions between adjacent linear motors, and thus an optimization of the thrust force curve with a maximization of the thrust force at the transition.

The teeth usually each have a first tooth flank, a second tooth flank, a first forming angle between the free end and the first tooth flank and a second forming angle between the free end and the second tooth flank, with the first forming angle and/or the second forming angle of the marginal teeth being different from the respective forming angles of the other teeth.

The sum of the two forming angles of the marginal teeth is preferably identical to the sum of the two forming angles of the other teeth. This is in particular advantageous to be able to arrange the coil body, which regularly has a pre-defined, slight conicity or a draft angle, in a matching manner at the marginal tooth.

The teeth have a height from the tooth base up to the free end and a width transverse to the height, namely from one tooth flank to the other tooth flank. The marginal teeth can have a smaller width than the other teeth, i.e. they can be thinner than the other teeth. At the same time, the marginal teeth can have a greater height than the other teeth.

The number of windings of the drive coils arranged at the marginal teeth is preferably identical to the number of windings of the drive coils arranged at the other teeth. This can apply even if the marginal teeth and the drive coils arranged thereat are higher than the other teeth. Due to the same number of windings at a greater height, the number of layers of the wound wire can be reduced, if necessary.

The respective free end of the marginal teeth can project beyond its respective drive coil in a connection region, with the connection region being suitable for attaching a cover of the linear motor.

The yoke can have a yoke thickness that is reduced in the region of the marginal teeth. The possibly higher marginal tooth can thereby be compensated by a reduced thickness of the yoke so that it preferably ends flush with the other teeth.

In one embodiment, the tooth pitch can increase towards the marginal teeth, wherein the largest tooth pitch is achieved between the marginal teeth and their respective adjacent teeth. In this embodiment, the tooth pitch between the teeth of a linear motor is consequently not or only partly constant, but increases steadily from tooth to tooth until it reaches its maximum between the marginal tooth and the directly preceding tooth. However, the tooth pitch between the two marginal teeth of adjacent linear motors is in this respect regularly larger than the tooth pitch between the marginal tooth and the directly preceding tooth. Thus, a tooth pitch varying in a sliding manner is to be achieved to divide the tooth pitch error among a plurality of teeth.

The teeth and/or the heads can be individual parts formed separately from the yoke, with the heads projecting at least partly laterally over the teeth. The teeth can thereby either be attached with their heads or the heads can be attached separately. This, for example, allows different teeth or heads to be provided in which the heads project laterally over the teeth and thus change the tooth pitch, in particular in an increasing manner. In this way, a slidingly varying tooth pitch can be achieved to divide the tooth pitch error among a plurality of teeth.

The transport system according to the invention is in particular a multi-carrier system that has a plurality of linear motors described above, which are arranged in a row and form a guide track, and at least one transport element that can be moved along the guide track by means of the linear motors.

Figure 2:
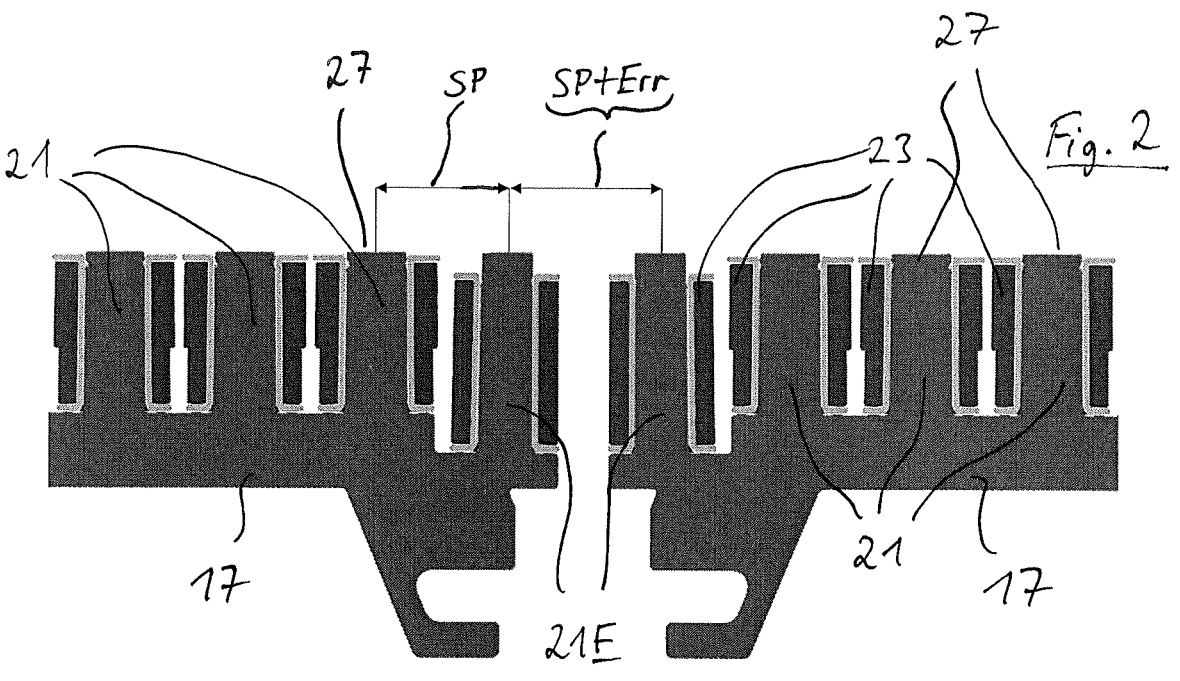
Figure 3:
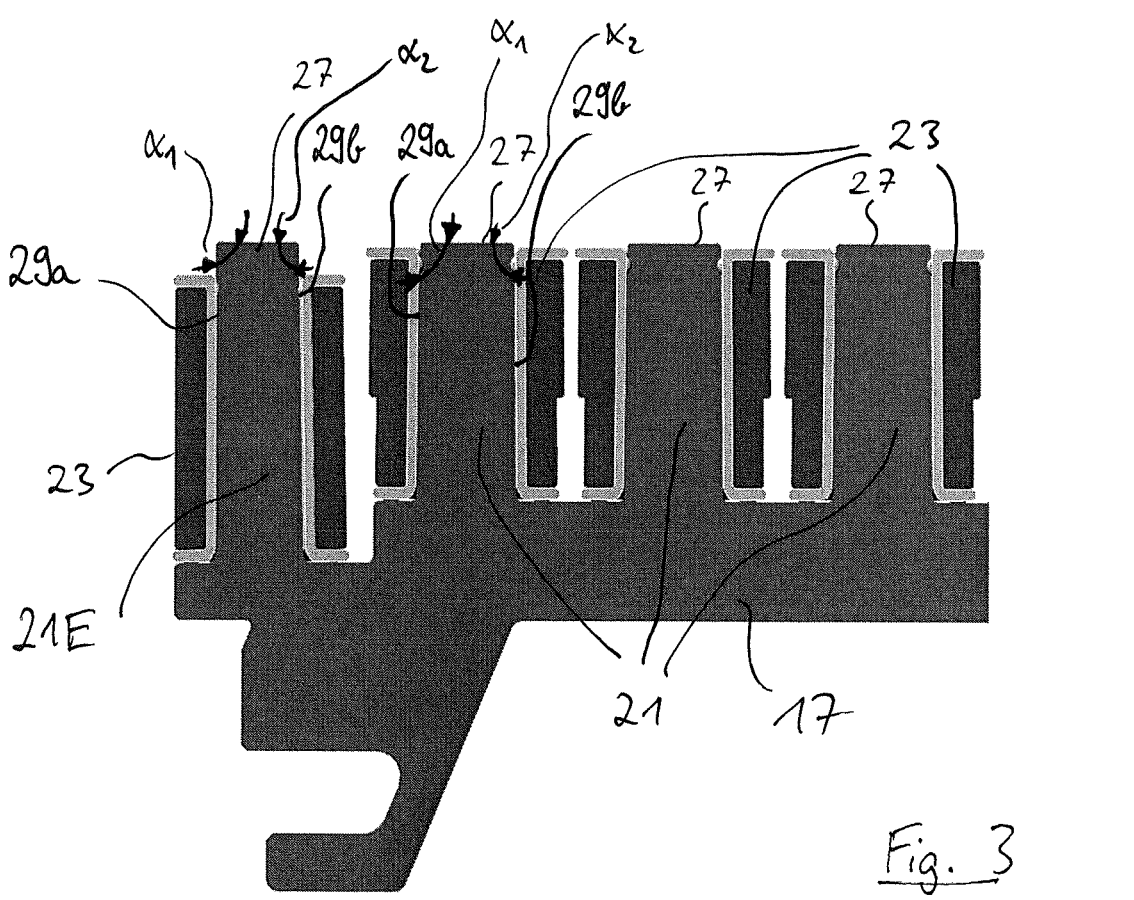
Figure 4:
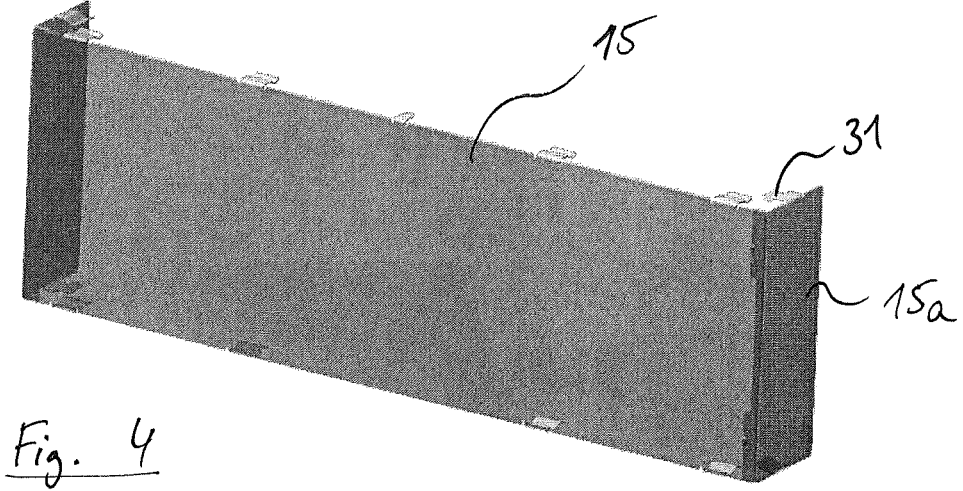
Figure 5:
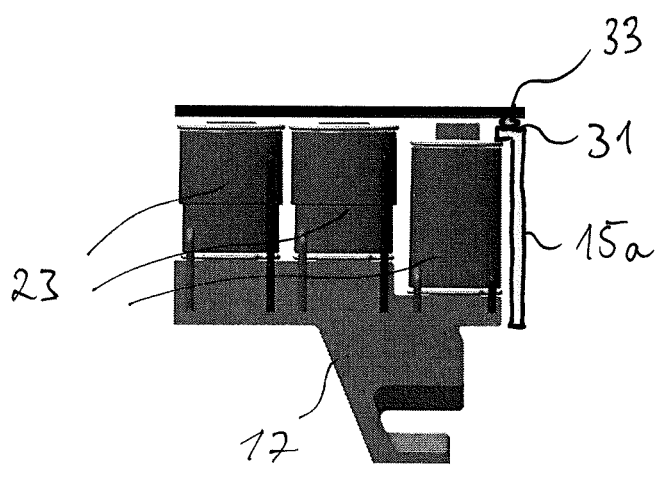

The invention will be described schematically and by way of example with reference to the drawings. It is shown therein:

FIG. 1 a perspective part view of a multi-carrier system;

FIG. 2 a partial view of two yokes with teeth and drive coils in the transition region of two linear motors;

FIG. 3 a side view of a part of a yoke with teeth and drive coils;

FIG. 4 a cover of a linear motor;

FIG. 5 a side view of a yoke with drive coils and the cover fastened; and

FIGS. 6*a* to 6*d* different versions of a yoke with respective teeth.

FIG. 1 shows a part of a transport system 10 configured as a multi-carrier system in perspective. The transport system 10 has a plurality of linear motors 11 that are arranged in a row and form a guide track 13 along which a plurality of transport elements 19, only one of which is shown here, are usually moved by means of the linear motors 11. The linear motors 11 can be arranged in a self-contained manner and can form a closed guide track 13 for the transport elements 19 along which the transport elements 19 can theoretically be moved indefinitely, or it can be an "open" system with a beginning and an end.

The transport elements 19 are magnetically driven by the linear motors 11. For this purpose, the transport elements 19 have one or more drive magnets 25 that are acted on by a drive force by means of a changing and/or wandering magnetic field generated by the linear motors 11. The drive force leads to a movement of the transport elements 19 along the guide track 13. The transport elements 19 can in particular be moved independently and separately from one another. The linear motors 11 are controlled by a control unit, not shown, to drive the respective transport elements 19.

To generate the changing and/or wandering magnetic field, the linear motors 11, as shown in FIGS. 2 and 3, are each provided with drive coils 23 that cooperate with the drive magnets 25 of the transport elements 11. The drive coils 23 are arranged at teeth 21 of a yoke 17, wherein the teeth 21 are arranged in a row along the direction of extent of the yoke 17 and extend in parallel with one another and laterally to the direction of extent of the yoke 17. The first and last tooth 21 of each linear motor 11 can in this respect be referred to as marginal teeth 21E. In the present example, the yoke 17 and the teeth 21, 21E are formed in one part and preferably consist of a ferromagnetic material.

The teeth 21 each have a tooth base at the connection point with the yoke 17, a head 27 having a free end, a first tooth flank 29*a* extending from the tooth base to the free end, a second tooth flank 29*b* extending from the tooth base to the free end, a first forming angle $\alpha_1$ between the free end and the first tooth flank 29*a*, and a second forming angle $\alpha_2$ between the free end and the second tooth flank 29*b*.

The heads 27 of adjacent teeth 21 are each spaced apart from one another by a tooth pitch SP indicated in FIG. 2 that defines the spacing between the center axes of two adjacent teeth 21 at their free ends and, accordingly, the spacing of the center axes of two adjacent drive coils 23. Ideally, within a linear motor 11 or within all the linear motors 11 of a transport system 10, the tooth pitches SP between the teeth 21 are identical.

Between the last marginal tooth 21E of a linear motor 11 and the first marginal tooth 21E of a directly following linear motor 11, the tooth pitch SP, as shown in FIG. 2, is generally not to be maintained, but the spacing between the two marginal teeth 21E is increased by the tooth pitch error Err. This is caused by tolerances, an assembly gap, material expansions due to temperature increases, but also, as can be seen from FIGS. 4 and 5, by the requirement to attach a cover 15 with a side cover 15*a* in the transition region between two linear motors 11. The tooth pitch errors Err, insofar as they deviate from the ideal value, lead to magnetic discontinuities and to a resulting reduced drive force for the transport elements 19 at the transitions and thus have to be eliminated as far as possible or set to an optimized value.

In the present embodiment according to FIGS. 2 and 3, the two marginal teeth 21E are slightly inclined with respect to the other teeth 21 in the direction of extent of the respective linear motor 11 or the respective yoke 17 so that the respective free ends of the marginal teeth 21E are slightly closer to the adjacent marginal teeth 21E of the adjacent linear motors 11 than the tooth base of the respective marginal tooth 21E. In other words, the tooth base of the respective marginal tooth 21E is somewhat closer to the adjacent tooth 21 of the same linear motor 11 in the direction of extent than the free end of this marginal tooth 21E. The angle of inclination of the end teeth 21E can, for example, amount to approximately 0.5° to approximately 1°. However, larger or smaller inclination angles in the range from approximately 0.2° to approximately 3° are also conceivable.

Furthermore, in the embodiment shown, the first forming angle $\alpha_1$ and the second forming angle $\alpha_2$ of the marginal teeth 21E differ from the respective forming angles $\alpha_1$, $\alpha_2$ of the other teeth 21. However, the sum of the two forming angles $\alpha_1$, $\alpha_2$ of the marginal teeth 21E is identical to the sum of the two forming angles $\alpha_1$, $\alpha_2$ of the other teeth 21. For example, it is conceivable that the forming angles $\alpha_1$, $\alpha_2$ of the teeth 21 each amount to approximately 90.5°, whereas one of the forming angles $\alpha_1$, $\alpha_2$ of a marginal tooth 21E amounts to 90° and the other forming angle $\alpha_1$, $\alpha_2$ of that marginal tooth 21E amounts to 91°.

In other embodiments, it is, however, generally also conceivable that the second forming angle $\alpha_2$ of the marginal teeth 21E is equal to the respective second forming angles $\alpha_2$ of the other teeth 21 by correspondingly reducing the draft angle at the coil body of the drive coil 23 at the marginal tooth 21E. In this case, the sum of the two forming angles $\alpha_1$, $\alpha_2$ of the marginal teeth 21E is not identical to the sum of the two forming angles $\alpha_1$, $\alpha_2$ of the other teeth 21.

The inclination of the marginal teeth 21E causes the tooth base of the marginal tooth 21E to move closer to the tooth base of its neighboring tooth 21. The marginal region of the linear motor 11 can thereby be made more compact, in particular with regard to the installation of the cover 15. Thus, the tooth pitch SP between adjacent marginal teeth 21E of adjacent linear motors 11 can be set so that the tooth pitch error Err is as close as possible to its desired value. The ideal value for the tooth pitch error Err can be "zero", but depending on the transport system, the ideal value can also be not equal to zero, for example to meet requirements for a specific protection class. The optimization of the tooth pitch error Err enables a homogenization of the magnetic field, in particular at the transitions between adjacent linear motors 11, and thereby an optimization of the thrust force curve with a maximization of the thrust force at the transition.

Due to the slight inclination of the marginal teeth 21E, the space between the two marginal teeth 21E can therefore be made more compact so that the marginal teeth 21E move closer to one another, a corresponding displacement of the free ends of the marginal teeth 21E is achieved, and the tooth pitch error Err can thus be reduced. In this respect, the adaptation of the forming angles $\alpha_1$, $\alpha_2$ has the effect that the marginal tooth 21E, namely in particular the tooth base, is not moved too much to the outside, i.e. towards the end of the respective linear motor 11. By keeping the sum of the forming angles $\alpha_1$, $\alpha_2$ constant, it can in particular be ensured that a coil body of the drive coil 23, which regularly has a predefined, slight conicity or a draft angle, can be arranged in a matching manner at the marginal tooth 21E, which is, however, generally also possible when the sum of the forming angles $\alpha_1$, $\alpha_2$ is not kept exactly constant.

As FIGS. 2 and 3 furthermore show, the marginal teeth 21E have a smaller width, i.e. a smaller spacing between the two tooth flanks 29a, 29b, compared to the other teeth 21.

Furthermore, the marginal teeth 21E have a greater height from their tooth base to their free end compared to the other teeth 21. So that the free ends of the marginal teeth 21E are nevertheless at least substantially flush with the free ends of the other teeth 21, the yoke 17 is reduced accordingly in terms of its thickness in the region of the marginal teeth 21E. The greater height of the marginal teeth 21E causes the marginal tooth 21E to project slightly beyond its drive coil 23, as shown in FIG. 5, even though the drive coil 23 at the marginal tooth 21E likewise has a slightly greater height than the drive coils 23 of the other teeth 21. It follows that in this region, as shown in FIGS. 4 and 5, the side cover 15a can be positioned with a connection element 31 and can in particular be fastened by means of an adhesive 33, alternatively, for example, by means of rivets. Since such a compact attachment of the cover 15 and in particular of the side cover 15a can be achieved in this manner, the increase in the tooth pitch error Err can likewise be counteracted since the spacing between adjacent linear motors 11 is reduced.

Even though the drive coil 23 at the marginal tooth 21E has a slightly greater height than the drive coils 23 of the other teeth 21, in the present embodiment, for the same wire diameter, the number of windings of the drive coils 23 arranged at the marginal teeth 21E is the same as the number of windings of the drive coils 23 arranged at the other teeth 21. Due to the lower height, this can under certain circumstances result in a higher number of layers at the other teeth 21 compared to the drive coils 23 of the marginal teeth 21E.

FIGS. 6a to 6d show further alternative possibilities of implementing the invention. These have in common that the tooth pitch SP within a linear motor 11 is not constant, but successively increases towards the marginal teeth 21E, wherein the largest tooth pitch SP within a linear motor 11 is achieved between the marginal teeth 21E and their respective adjacent teeth 21. In this respect, the tooth pitch SP between the two marginal teeth 21E of adjacent linear motors 11 is, however, regularly larger than the tooth pitch SP between the marginal tooth 21E and the directly preceding tooth 21. Thus, a slidingly varying tooth pitch SP can be achieved to "divide" the tooth pitch error Err among a plurality of teeth 21.

Figures 6A, 6B, 6C, 6D:
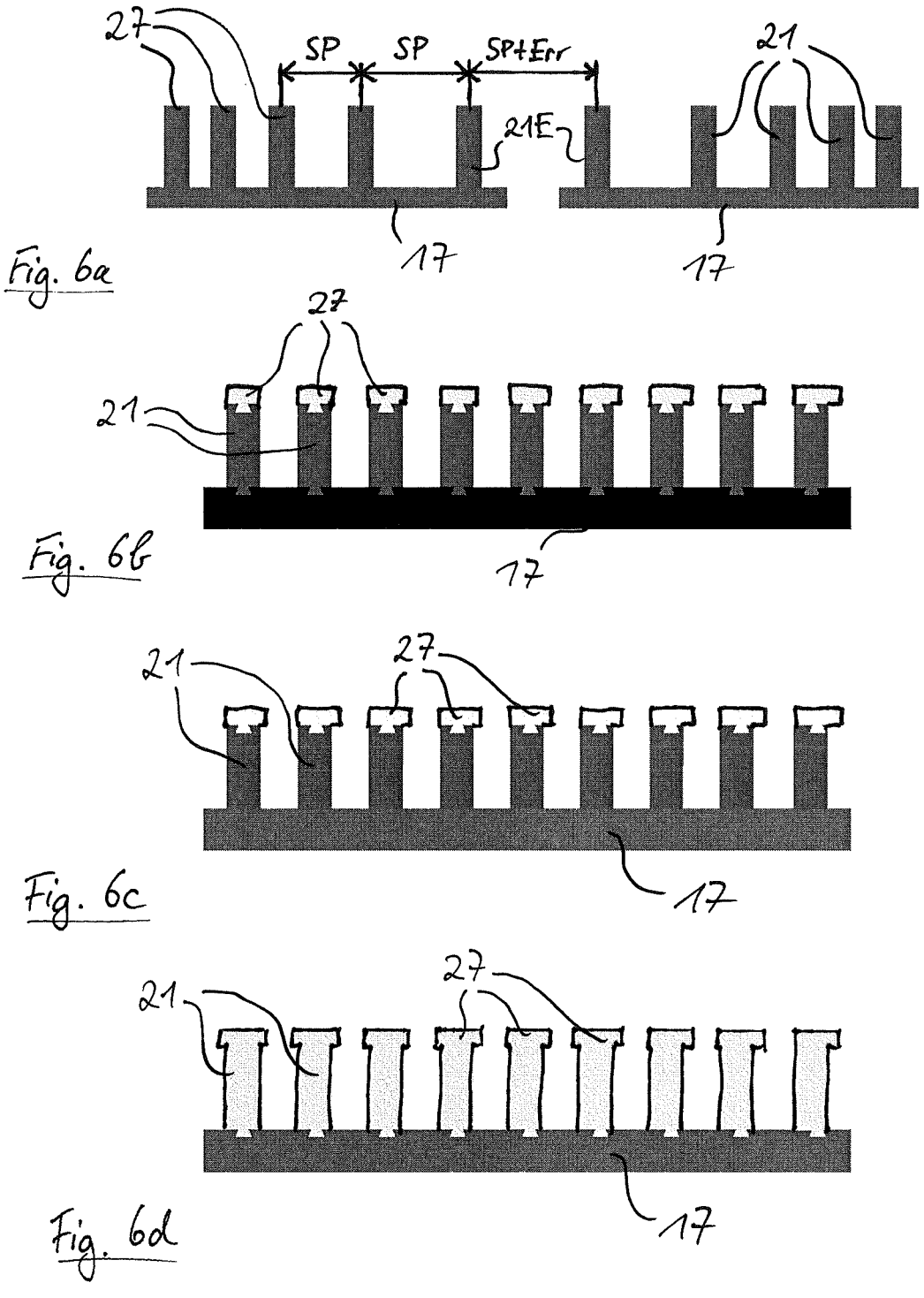

FIG. 6a provides that this effect is achieved by continuously increasing the spacings of the entire teeth 21, 21E from one another, i.e. also the tooth pitch SP. In FIGS. 6b to 6d, a successively increased tooth pitch SP is achieved by the teeth 21 and/or the heads 27 being formed separately from the yoke 17 as individual parts and the heads 27 projecting at least partly laterally over the teeth 21. Thus, in FIG. 6b, the teeth 21 and the heads 27 are formed separately from the yoke 17. In FIG. 6c, the yoke 17 is formed in one part with the teeth 21, wherein the heads 27 are interchangeable. In FIG. 6d, heads 27 and teeth 21 are formed together in one part and can be connected to the yoke 17.

Since the heads 27 and/or the teeth 21 can be adapted to their respective positions, this allows a selection in which the heads 27 project laterally over the teeth 21 in a successively increasing manner so that the tooth pitch SP can be set in a sliding and successively increasing manner to divide the tooth pitch error Err among a plurality of teeth 21.

REFERENCE NUMERAL LIST

10 transport system
11 linear motor
13 guide track
15 cover
15*a* side cover
17 yoke
19 transport element
21 tooth
21E marginal tooth
23 drive coil
25 drive magnet
27 head
29*a* tooth flank
29*b* tooth flank
31 connection element
33 adhesive
$\alpha_1$ forming angle
$\alpha_2$ forming angle
SP tooth pitch
Err tooth pitch error

The invention claimed is:

1. A linear motor for a transport system with a transport element movable on a guide track, the linear motor comprising:

a yoke comprising a plurality of teeth arranged one after another between two ends of the yoke; and a plurality of drive coils arranged at the teeth and configured to cooperate with one or more drive magnets of the transport element to bring about a drive force for moving the transport element along the guide track of the transport system, wherein the teeth have marginal teeth arranged at the two ends of the yoke, wherein the marginal teeth at the two ends of the yoke are inclined with respect to the other teeth, and wherein the other teeth are all substantially parallel to one another and project in substantially the same direction.

2. The linear motor according to claim 1, wherein the transport system is a multi-carrier system.

3. The linear motor according to claim 1, wherein one or both of the marginal teeth are inclined in the direction of extent of the yoke.

4. The linear motor according to claim 1, wherein the teeth each has a first tooth flank, a second tooth flank, a first forming angle between a free end of the tooth and the first tooth flank, and a second forming angle between the free end and the second tooth flank, and wherein the first forming angle and/or the second forming angle of the marginal teeth are different from the respective first and/or second forming angles of the other teeth.

5. The linear motor according to claim 4, wherein a sum of the first and second forming angles of the marginal teeth is identical to a sum of the first and second forming angles of the other teeth.

6. The linear motor according to claim 1, wherein the teeth each has a tooth base, with the tooth bases of adjacent teeth being spaced apart from one another by a tooth base spacing, and with the tooth base spacing of the marginal teeth from their adjacent teeth being different from the tooth base spacing of the other teeth from one another.

7. The linear motor according to claim 1, wherein the teeth each has a tooth base, with the tooth bases of adjacent teeth being spaced apart from one another by a tooth base spacing, and with the tooth base spacing of the marginal teeth from their adjacent teeth being smaller than the tooth base spacing of the other teeth.

8. The linear motor according to claim 1, wherein the marginal teeth have a smaller width than the other teeth.

9. The linear motor according to claim 1, wherein the marginal teeth have a greater height from a tooth base to the free end of the respective tooth than the other teeth.

10. The linear motor according to claim 9, wherein the number of windings of the drive coils arranged at the marginal teeth is identical to the number of windings of the drive coils arranged at the other teeth.

11. The linear motor according to claim 9, wherein the respective free end of the marginal teeth projects beyond its respective drive coil in a connection region, with the connection region being suitable for attaching a cover of the linear motor.

12. The linear motor according to claim 1, wherein the yoke has a yoke thickness that is reduced in the region of the marginal teeth.

13. A linear motor for a transport system with a transport element movable on a guide track, the linear motor comprising:

a yoke comprising a plurality of teeth arranged one after another between two ends of the yoke; and a plurality of drive coils arranged at the teeth and configured to cooperate with a drive magnet of the transport element to generate a drive force that moves the transport element along the guide track of the transport system, wherein the teeth have marginal teeth arranged at the two ends of the yoke, wherein at least one of the marginal teeth is inclined with respect to the other teeth, and wherein the teeth each has a free end with a head at the free end, the heads of adjacent teeth are spaced apart from one another by a tooth pitch, the tooth pitch increases towards the marginal teeth, and a largest tooth pitch is located between the marginal teeth and respective ones of the teeth adjacent the marginal teeth.

14. The linear motor according to claim 13, wherein both of the marginal teeth are inclined with respect to the other teeth.

15. The linear motor according to claim 13, wherein the teeth and/or the heads of the teeth are individual parts formed separately from the yoke, with the heads projecting at least partly laterally over the teeth.

16. The linear motor according to claim 13, wherein the marginal teeth are both inclined with respect to the other teeth, and wherein the other teeth are all substantially parallel to one another and projecting in substantially the same direction.

17. The linear motor according to claim 13, wherein the two ends of the yoke each includes a stepped shelf interposed between the marginal tooth and a respective one of the other teeth immediately adjacent the marginal tooth.

18. The linear motor according to claim 13, wherein the marginal teeth each has a substantially uniform first width along a length thereof and all of the other teeth have a substantially uniform second width, wider than the first width, along a length thereof.

19. A linear motor for a transport system with a transport element movable on a guide track, the linear motor comprising:

a yoke comprising a plurality of teeth arranged one after another between two ends of the yoke; and a plurality of drive coils arranged at the teeth and configured to cooperate with a drive magnet of the transport element to generate a drive force that moves the transport element along the guide track of the transport system, wherein the teeth have marginal teeth arranged at the two ends of the yoke, wherein at least one of the marginal teeth is inclined with respect to the other teeth, and wherein the marginal teeth each has a substantially uniform first width along a length thereof and all of the other teeth have a substantially uniform second width, wider than the first width, along a length thereof.

20. A linear motor for a transport system with a transport element movable on a guide track, the linear motor comprising:

a yoke comprising a plurality of teeth arranged one after another between two ends of the yoke; and a plurality of drive coils arranged at the teeth and configured to cooperate with a drive magnet of the transport element to generate a drive force that moves the transport element along the guide track of the transport system, wherein the teeth have marginal teeth arranged at the two ends of the yoke, wherein at least one of the marginal teeth is inclined with respect to the other teeth, and wherein the two ends of the yoke each includes a stepped shelf interposed between the marginal tooth and a respective one of the other teeth immediately adjacent the marginal tooth.

* * * * *